US008852339B2

(12) United States Patent
Walenta et al.

(10) Patent No.: US 8,852,339 B2
(45) Date of Patent: Oct. 7, 2014

(54) INDUSTRIAL PROCESS FOR THE PRODUCTION OF A CLINKER WITH A HIGH CONTENT OF BELITE

(75) Inventors: Gunther Walenta, Genas (FR); Cédric Comparet, Optevoz (FR); Vincent Morin, Lyons (FR)

(73) Assignee: Lafarge, Paris (FR)

( * ) Notice: Subject to any disclaimer, the term of this patent is extended or adjusted under 35 U.S.C. 154(b) by 536 days.

(21) Appl. No.: 13/375,640

(22) PCT Filed: Jun. 7, 2010

(86) PCT No.: PCT/FR2010/051115
§ 371 (c)(1), (2), (4) Date: Dec. 1, 2011

(87) PCT Pub. No.: WO2010/146281
PCT Pub. Date: Dec. 23, 2010

(65) Prior Publication Data

US 2012/0085265 A1 Apr. 12, 2012

(30) Foreign Application Priority Data

Jun. 17, 2009 (FR) .................................... 09 02938

(51) Int. Cl.
*C04B 7/34* (2006.01)
*C04B 7/32* (2006.01)
*C04B 7/345* (2006.01)

(52) U.S. Cl.
CPC ............... *C04B 7/323* (2013.01); *C04B 7/3453* (2013.01)
USPC .......................................... 106/739; 106/743

(58) Field of Classification Search
CPC ............................. C04B 7/3453; C04B 7/323
USPC ................................................ 106/739, 743
See application file for complete search history.

(56) References Cited

U.S. PATENT DOCUMENTS

| | | | | |
|---|---|---|---|---|
| 3,801,338 | A | 4/1974 | Whitaker | |
| 4,318,744 | A | 3/1982 | Dodson | |
| 4,373,956 | A | 2/1983 | Rosskopf | |
| 4,798,628 | A | 1/1989 | Mills et al. | |
| 5,017,234 | A | 5/1991 | Gartner et al. | |
| 8,177,903 | B2 * | 5/2012 | Walenta et al. | 106/695 |
| 8,574,359 | B2 * | 11/2013 | Marchi et al. | 106/693 |
| 2007/0266903 | A1 | 11/2007 | Gartner et al. | |

FOREIGN PATENT DOCUMENTS

| | | |
|---|---|---|
| EP | 0 812 811 B1 | 4/2003 |
| FR | 834 645 | 11/1938 |
| FR | 2 873 366 | 1/2006 |
| WO | WO 99/02465 | 1/1999 |
| WO | WO 03/054346 | 7/2003 |

OTHER PUBLICATIONS

Yanjun L et Al. "Influence of phosphate on the composition and properties of alite-sulphoaluminate cement" ZKG International, No. 3/2000. vol. 53, Mar. 1, 2000, pp. 164-166.
Kapralik, I. et Al. "Phases changes in the System CaO—Al2O3—SiO2—Fe2O3—MgO—CaSO4—K2SO4 in Air up to 1300° C referred to Sulphoaluminate cement Clinker", British Ceramic Society., vol. 85, No. 4, Aug. 1986, pp. 132-136.
Halstead et Al. "The composition and crystallography of an anhydrous calcium aluminosulphate occurring in expanding cement." K. Appl. Chem. vol. 12, Sep. 1962, pp. 413-417.
Zhang Jusong et al.; "The influence of TiO2 on the formation of Belite-Calcium Sulfoaluminate Cement" Cement Guide for New Epoch, No. 3 , pp. 17-19, 2002.
Woo-Hyeong Chae "Early Hydration of modified Belite Cement prepared by adding Borax" The Korean Journal of Chemistry 2 (3), pp. 147-151, 1996.
Majling et al.; "Generalized Bogue computations to forecase the mineralogical composition of sulfoaluminate cements based on fly ashes", Advances in Cement Research, London, GB, 1999, 11, No. 1, Jan. 1, 1999; pp. 27-34.
Mehta; "Investigations on energy-saving cements"; World Cement Technolgoy, Cement and Concrete Association, London, GB, May 1, 1980; pp. 166-177.
Arjunan, et al.; "Sulfoaluminate-bile cement from low-calcium fly ash and sulfur-rich and other industrial by-products"; Cement and Concrete Research, Pergamon Press, Elmsford, NY, US LNKD-DOI:10:1016/S0008-8846(99)00072-1, vol. 29, No. 8, Jan. 1, 1999; pp. 1305-1311.
Written Opinion of the International Searching Authority for Appln. No. PCT/FR2010/051115.
International Search Report for PCT/FR2010/051115.

* cited by examiner

*Primary Examiner* — Paul Marcantoni
(74) *Attorney, Agent, or Firm* — Pillsbury Winthrop Shaw Pittman LLP

(57) ABSTRACT

The present invention relates to a process for the production of a clinker with a high content of belite, said process comprising the following steps:
(i) introducing a raw meal into a calcination chamber of a cement plant kiln;
(ii) calcining the raw meal at a temperature of from 1150° C. to 1375° C.;
(iii) measuring the weight per liter of the product of step (ii) and eliminating the product having a weight per liter strictly less than 650 g/liter;
(iv) measuring the quantity of $SO_3$ in the product of step (ii) and eliminating the product having a ratio of quantity of $SO_3$ of the decarbonated raw meal/quantity of $SO_3$ in the product of step (ii) less than or equal to 0.75 and greater than or equal to 1.2;
(v) measuring the quantity of free lime (CaOl) in the product of step (ii) and eliminating the product having a quantity of free lime strictly greater than 1.5%, percentage by mass of free lime in the product of step (ii).

6 Claims, No Drawings

INDUSTRIAL PROCESS FOR THE PRODUCTION OF A CLINKER WITH A HIGH CONTENT OF BELITE

CROSS-REFERENCE TO RELATED APPLICATIONS

This is the U.S. National Stage of PCT/FR2010/051115, filed Jun. 7, 2010, which in turn claims priority to French Patent Application No. 09/02938, filed Jun. 17, 2009, the entire contents of all applications are incorporated herein by reference in their entireties.

The present invention relates to an industrial process for the production of a clinker with a high content of belite.

Clinkers with high contents of belite are clinkers with low contents of alite or an absence of alite, which is one of the mineral phases of conventional clinkers of the Portland type.

Clinkers with a high content of belite have been developed by industrialists. These clinkers have the further advantage of substantially reducing emissions of CO2 compared to the production of Portland types of clinkers.

These clinkers with a high content of belite produce cements whose mechanical strengths meet or exceed standard requirements and performances required in applications of current modern concretes.

However the production of these clinkers with a high content of belite in conventional kilns for the Portland types of clinkers requires additional burning indicators and adapted to their production.

Therefore, the problem which the invention intends to solve is to provide a new industrial process for production of clinker with a high content of belite.

Unexpectedly, the inventors have shown that it is possible to produce a clinker with a high content of belite in a conventional cement plant kiln by respecting certain conditions.

With this aim the present invention provides a process for the production of a clinker comprising from 40 to 75% of belite, % expressed by mass relative to the total mass of clinker, said process comprising the following steps:

(i) introducing a raw meal into a calcination chamber of a cement plant kiln;

(ii) calcining the raw meal at a temperature of from 1150° C. to 1375° C.;

(iii) measuring the weight per liter of the product of step (ii) and eliminating the product having a weight per liter strictly less than 650 g/liter;

(iv) measuring the quantity of $SO_3$ in the product of step (ii) and eliminating the product having a ratio of quantity of $SO_3$ of the decarbonated raw meal/quantity of $SO_3$ in the product of step (ii) less than or equal to 0.75 and greater than or equal to 1.2;

(v) measuring the quantity of free lime (CaOl) in the product of step (ii) and eliminating the product having a quantity of free lime strictly greater than 1.5%, percentage by mass of free lime in the product of step (ii).

The invention also relates to a clinker with a high content of belite obtainable by the process described herein above.

The invention offers at least one of the determining advantages described herein below.

Advantageously, the process according to the invention may be implemented in all cement plant kilns, including conventional kilns used to produce the Portland type of clinker.

Another advantage of the invention is that the process according to the invention requires lower burning temperatures than those required for the production of a Portland type of clinker.

Another advantage of the present invention is that the indicators monitoring the burning (that is to say steps (iii), (iv) and (v)) can be easily implemented in a cement plant.

Furthermore, the process according to the invention does not require a specific cement plant kiln.

Another advantage the invention provides is that the process according to the invention for the production of clinker with a high content of belite makes it possible to reduce the energy required by approximately 20% compared to a process for production of Portland clinker.

Finally, another advantage the invention provides is that the process according to the invention for the production of clinker with a high content of belite makes it possible to reduce emissions of $CO_2$ by approximately 20% compared to a process for production of Portland clinker.

Other advantages and characteristics of the invention will clearly appear after reading the following description and examples given purely by way of illustration and non-restrictive purposes.

For the remaining of the description of the invention, the following abbreviated notations will be used, unless explicitly stated otherwise, to designate the mineral components of the cement:

C represents CaO (lime), and CaOl represents the free lime not combined in the clinker, A represents $Al_2O_3$ (alumina), F represents $Fe_2O_3$, S represents $SiO_2$ (silica), T represents le TiO2, $ represents $SO_3$.

The expression <<hydraulic binder>>, is to be understood according to the present invention as any compound which has the property of becoming hydrated in the presence of water and the hydration of which makes it possible to obtain a solid having mechanical characteristics. The hydraulic binder according to the invention may in particular be a cement. Preferably, the hydraulic binder according to the invention is a cement.

The expression <<Portland cement>>, is to be understood according to the invention as a cement of type CEM I, CEM II, CEM III, CEM IV or CEM V according to the NF EN 197-1 <<Cement>> Standard.

The expression <<Portland clinker>>, is to be understood according to the invention as a clinker as defined by the NF EN 197-1 <<Cement>> Standard.

The term <<feldspars>>, is to be understood according to the invention as a mineral with a double base of potassium aluminosilicate, sodium aluminosilicate or calcium aluminosilicate. The feldspars are in the tectosilicate family. Many feldspars exist, the main feldspars are potassic orthoclase, sodic albite and calcic anorthite. The mix of the latter two provides the series of plagioclases.

The term <<clinker>>, is to be understood according to the invention as the product obtained after burning (clinkerisation) of a mix (raw meal).

The following terms, are to be understood according to the invention:

$C_3S$: impure tricalcium silicate ($Ca_3SiO_5$): (Alite) 3(CaO).($SiO_2$)

$C_2S$: impure dicalcium silicate ($Ca_2SiO_4$): (Belite) 2(CaO).($SiO_2$)

$C_3A$: Tricalcium aluminate ($Ca_3Al_2O_6$): (Aluminate) 3(CaO).($Al_2O_3$)

$C_4AF$: Tetracalcium-aluminateferrite ($Ca_4Al_2Fe_2O_{10}$): (Ferrite or aluminoferrite or brownmillerite) 4(CaO).($Al_2O_3$).($Fe_2O_3$), or more generally a compound of the general formula $2(CaO).x(Al_2O_3).(1-x)(Fe_2O_3)$ wherein X is from 0.2 to 0.8

$C_4A_3\$$: calcium sulfoaluminate <<ye'elimite>> $4(CaO).3(Al_2O_3).(SO_3)$

Limestone: $CaCO_3$

Gypsum: $CaSO_4.2(H_2O)$;

Calcium sulphate hemihydrate: $CaSO_4.0.5H_2O$;

Anhydrous calcium sulphate: $CaSO_4$;

Periclase: MgO;

Sand, silica: $SiO_2$.

The term <<phase>>, is to be understood according to the invention as a mineralogical phase.

The term <<element>>, is to be understood according to the invention as a chemical element according to the Periodic Table of Elements.

The term <<clay>>, is to be understood according to the present invention as a sedimentary rock, for a large part composed of specific minerals, silicates, generally of more or less hydrated aluminium, which have a layer structure (phyllosilicates), or a fibrous structure (sepiolite and palygorskite).

The term <<setting>>, is to be understood according to the present invention as the passage to the solid state by chemical hydration reaction of the hydraulic binder. The setting is generally followed by a hardening period.

The term <<hardening>>, is to be understood according to the present invention as the acquisition of mechanical properties of a hydraulic binder, after the end of the setting phase.

First of all the present invention relates to a process for the production of a clinker comprising from 40 to 75% of belite, % expressed by mass relative to the total mass of clinker, said process comprising the following steps:

(i) introducing a raw meal into a calcination chamber of a cement plant kiln;

(ii) calcining the raw meal at a temperature of from 1150° C. to 1375° C.;

(iii) measuring the weight per liter of the product of step (ii) and eliminating the product having a weight per liter strictly less than 650 g/liter;

(iv) measuring the quantity of $SO_3$ in the product of step (ii) and eliminating the product having a ratio of quantity of $SO_3$ of the decarbonated raw meal/quantity of $SO_3$ in the product of step (ii) less than or equal to 0.75 and greater than or equal to 1.2;

(v) measuring the quantity of free lime (CaOl) in the product of step (ii) and eliminating the product having a quantity of free lime strictly greater than 1.5%, percentage by mass of free lime in the product of step (ii).

The process according to the invention makes it possible to produce a clinker with a high content of belite, comprising from 40 to 75% of belite, preferably from 45 to 70% of belite, preferably from 45 to 65% of belite, more preferably from 50 to 60% of belite % expressed by mass relative to the total mass of clinker.

Step (i) may be carried out by introducing a raw meal in the form of powder (dry method), of granules (semi-dry method) or in the form of a liquid paste (wet or semi-wet method). By the dry method, the raw meal is directly introduced in the kiln in a pulverulent form, after optionally pre-heating in optionally a thermal exchange tower. By the semi-dry method, before introduction in the kiln, the raw meal is transformed into "granules" by humidification in big inclined rotating <<plates>>. By the wet method, the raw meal is mixed with water to form a liquid paste. The paste is then stored in big basins of several thousand cubic meters, where it is continuously mixed and homogenized. This mix is called the raw meal. The paste is then conveyed to the input of the kiln, heated at its end by an internal flame.

Preferably, step (i) is carried out by the semi-dry method introducing a raw meal in the form of granules.

The raw meal may comprise natural raw materials, extracted from quarries.

The raw meal introduced in step (i) comprises at least a source of calcium, a source of silica, a source of alumina, a source of iron, a source of sulphur, a source of boron.

Preferably, the raw material feed (called raw materials) suitable to produce the raw meal in step (i) are:

a source of calcium, for example limestone, clay, marl, aragonite, chalk, cement rock, sea shells, fly ash, pozzolans, or calcined household residue; the source of calcium may come from quarries or be the result of an industrial process. The by-products of various industrial processes are also suitable to be used as sources of lime. For example, certain waste residue from gas purifiers contains a substantial quantity of lime. Kiln dust is also quite appropriate; it is normally collected at the outlet of typical cement kilns;

a source of silica for example, clay, marl, fly ash, pozzolans, silica fume, shale, slate or sand; the source of silica may come from quarries or be the result of an industrial process, for example slags.

a source of alumina, for example, clay, marl, fly ash, pozzolans, bauxite, alumina red mud, in particular alumina mud coming from industrial waste during the extraction of alumina, laterites, anorthosites, albites, feldspars; the source of alumina may come from quarries or be the result of an industrial process or its waste; silica and alumina are often found together in nature, as well as in by-products of the scoriae type resulting from numerous industrial processes, therefore very often the source of silica serves also as a source of alumina;

a source of iron, for example iron oxide, iron ore; the source of iron may come from quarries or be the result of an industrial process or of numerous clay substances;

a source of sulphur, for example a sulphate salt or the sulphur present in the fuel used to heat the kiln, which reacts with the other raw materials during the clinkerisation process and becomes a component in the final clinker or gypsum, calcium sulphate hemihydrate (α or β), or anhydrous calcium sulphate; the suitable sources of calcium sulphate according to the invention may come from quarries or be the result of an industrial process;

a source of boron, for example borax, boric acid, colemanite or any other compound containing boron; the source of boron may come from quarries or be the result of an industrial process.

Additionally, the raw material feed may contain other chemical elements, for example MgO, $Na_2O$, $K_2O$, $TiO_2$, $P_2O_5$, SrO, $Mn_2O_3$, Cl, F.

Another source of lime, and mainly of silica is calcium silicate (CaO, $SiO_2$) which is found in slag coming from numerous industrial processes. For example, blast furnaces used to produce steel produce a great quantity of slag.

The preparation of the raw meal introduced in step (i) may be carried out by mixing the raw materials. The raw materials may be mixed before step (i) by putting in contact, optionally comprising a step of grinding and/or homogenisation. Preferably the raw materials of the raw meal introduced in step (i) are optionally dried before step (i) or optionally calcined before step (i).

According to a variant of the invention, the process comprises a step of pre-calcining the raw meal.

Other raw materials may be introduced during step (i) for example:

a source of magnesium for example a magnesium salt;
a source of sodium for example a sodium salt;
a source of potassium for example a potassium salt;
a source of phosphorus for example a phosphorus salt;
a source of zinc for example a zinc oxide;
a source of manganese for example a manganese oxide;
a source of titanium for example a titanium oxide;
a source of fluorine for example fluorine salts;
a source of chlorine for example chlorine salts;
or mixtures thereof.

These raw materials may be in the form of a powder, or semi solid, or liquid or solid.

Step (ii) is a calcining step, which means according to the invention a burning step.

<<Calcination>> is to be understood according to the invention as the reaction between the chemical elements of the raw meal.

The calcination takes place at a temperature of from 1150° C. to 1375° C., preferably from 1200° C. to 1325° C., even more preferably from 1300° C. to 1325° C.

Preferably, the calcination takes place for a minimum of 20 minutes, more preferably for a minimum of 30 minutes, most preferably for a minimum of 45 minutes. The calcination time in particular will depend on the capacity of the kiln and on the temperature chosen for the burning.

Preferably, the calcination takes place in a sufficiently oxidising atmosphere, for example the atmosphere, but other sufficiently oxidising atmospheres may be suitable.

The process according to the invention may be carried out in a conventional cement plant kiln (for example a rotary kiln) or in another type of kiln (for example a continuous kiln). Step (ii) may be carried out in a rotary kiln or an electric kiln or a continuous kiln or any other type of cement plant kiln.

Rotary kilns vary in length and diameter. They turn slowly and, because they are slightly inclined, the load moves slowly down towards the hot end of the kiln. It is preferably heated from its bottom end. Special refractory materials are required, more particularly for the very hot zone at the bottom end of the kiln. Preferably, refractory materials are selected which do not interact with the liquid phase of the clinker during the burning. Preferably, the kiln should remain in operation continuously, otherwise the expensive refractory material could be damaged by thermal shocks during cooling and re-heating. Generally a rotary kiln is heated by burning fossil fuel at its bottom end, whilst the very hot combustion gases circulate upwards in the kiln. Thermal energy is transferred by direct contact with the introduced materials, which descend and also indirectly by heating the refractory lining. Because the introduced materials are preferably dried, heated and partially calcined by the very hot gases, part of the finer particles cluster together and are transported out of the kiln in the form of kiln dust.

At the start-up of the installation and according to one embodiment of the invention, the raw materials are fed to the grinder, in proportions adjusted in order to provide the components in the suitable ratio necessary for the production of clinker. The ground materials are fed into the kiln.

According to a preferred embodiment of the present process, a crusting operation is carried out from the liquid phase of the clinker during the burning to obtain a lining or “crust” lining inside the kiln, which serves as material to protect the refractory shell of the kiln.

At the time when the kiln is loaded, it is preferable to have a sufficiently high temperature to provoke the beginning of the chemical clinkerisation reaction. But, a temperature which is too high should be avoided, which would provoke an excess of the liquid phase, risking clogging the kiln by the formation of a ring and/or creating a flow of liquid material.

The duration of the burning step (ii) is specific to each kiln, and is determined in particular by the rotation speed of the kiln and/or the feed flow.

Step (iii) of the process according to the invention is a measurement of the weight per liter of the product of step (ii) and an elimination of the product having a weight per liter strictly less than 650 g/liter.

More particularly, during step (iii), the weight per liter of the product of step (ii) is measured and the product having a weight per liter greater than or equal to 650 g/liter, preferably from 800 g/liter to 1250 g/liter, more preferably from 850 g/liter to 1200 g/liter, most preferably equal to 1050 g/liter is not eliminated.

The weight per liter is measured in the following manner: The granules of clinker are selected within a granular range comprised from 5 to 10 mm, this selection is preferably carried out with sieves. These selected granules of clinker are then introduced in a container with a capacity equal to 1 liter. After introduction of the granules of clinker in the container, the top of the container is levelled with a ruler. It is important that the granules of clinker do not exceed the top of the container. The mass of clinker contained in this liter is then measured and the weight per liter is obtained, expressed in grammes of clinker/liter.

According to a variant of the invention, step (iii) can be replaced by another step which is a characterisation step of the apparent density of the product of step (ii). An example of direct measurement of the apparent density of the granules of clinker would be to use the mercury porosity-meter technique. The apparent density could be measured in the following manner: the granules of clinker are selected within a granular range comprised from 5 to 10 mm, this selection is preferably done with a sieve. These selected granules of clinker are then opened or split in two sections to allow the mercury to have access to the pores. The measurement of the mercury porosity is carried out until a pressure of approximately 4000 bars is reached. This measurement makes it possible to calculate the percentage of porosity of the granules and hence the weight per liter.

It is also possible to carry out the measurement of the apparent density with other techniques, for example hydrostatic weighing: granules of clinker are put into a bag, the difference of mass of the granules weighed in air and in water makes it possible to calculate the apparent density of the granules.

Step (iv) of the process according to the invention is a measurement of the quantity of $SO_3$ in the product of step (ii) and an elimination of the product having a ratio of quantity of $SO_3$ of the decarbonated raw meal/quantity of $SO_3$ in the product of step (ii) less than or equal to 0.75 and greater than of equal to 1.2.

Preferably, step (iv) of the process according to the invention is a measurement of the quantity of $SO_3$ in the product of step (ii) and an elimination of the product having a ratio of quantity of $SO_3$ of the decarbonated raw meal/quantity of $SO_3$ in the product of step (ii) less than or equal to 0.80 and greater than of equal to 1.15.

More preferably, step (iv) of the process according to the invention is a measurement of the quantity of $SO_3$ in the product of step (ii) and an elimination of the product having a ratio of quantity of $SO_3$ of the decarbonated raw meal/quantity of $SO_3$ in the product of step (ii) less than or equal to 0.90 and greater than of equal to 1.1.

Even more preferably, the product of step (ii) having a ratio of quantity of $SO_3$ of the decarbonated raw meal/quantity of $SO_3$ in the product of step (ii) equal to 1 is not eliminated.

The quantity of $SO_3$ of the decarbonated raw meal corresponds to a mass % of $SO_3$ relative to the total quantity of all the chemical constituents, determined for the decarbonated raw meal heated to 975° C.

Determination of the quantity of $SO_3$ may for example be carried out by measuring the X-ray fluorescence, for example according to the NF EN 196-2.2 Standard) or by the chemical gravimetric method, for example according to the NF EN 196-2 Standard, or by elementary analysis. In the case of the elementary analysis, the dosage of SO3 may be done using an elementary infrared analyzer.

Step (v) of the process according to the invention is a measurement of the quantity of free lime (CaOl) in the product of step (ii) and elimination of the product having a quantity of free lime strictly greater than 1.5%, percentage by mass of free lime in the product of step (ii).

According to a variant, the process according to the invention comprises a step of measuring the quantity of free lime (CaOl) in the product of step (ii), then elimination of the product having a quantity of free lime strictly greater than 1.5% with conservation of the product having a quantity of free lime less than or equal to 1.5%, percentage by mass of free lime in the product of step (ii).

Preferably, in step (v) of the process according to the invention, the product of step (ii) having a quantity of free lime strictly greater than 1% is eliminated, percentage by mass of free lime in the product of step (ii).

More preferably, in step (v) of the process according to the invention, the product of step (ii) having a quantity of free lime strictly greater than 0.5% is eliminated, percentage by mass of free lime in the product of step (ii).

Even more preferably, in step (v) of the process according to the invention, the product of step (ii) having a quantity of free lime comprised between 0 and 0.5% is conserved.

Determination of the quantity of free lime may be carried out by one of the typical methods used in the case of Portland cements which may be for example a dosage by analysis of the X-ray diffraction spectrum (example of DRX-Rietveld analyses or quantification based on the peak of CaOl), or by dosage of the complexometry type in the presence of EDTA after digestion in a solution of ethyleneglycol, or by an acid-base type of dosage after digestion in a solution of ethyleneglycol or by conductimetry after digestion in a solution of ethyleneglycol.

After step (v) of the process according to the invention, a clinker with a high content of belite is obtained.

Preferably step (v) is followed by a cooling step. This cooling step may be carried out for example by projecting water or by blowing air on the clinker leaving the kiln.

The invention also relates to a clinker with a high content of belite obtainable by the process according to the invention and described herein above.

Preferably, the clinker with a high content of belite according to the invention does not comprise $C_2AS$ and/or $C_{12}A_7$ and/or $C_3S$ and/or CT mineralogical phases.

According to a variant of the invention, the clinker with a high content of belite may comprise traces of $C_2AS$ and/or $C_{12}A_7$ and/or $C_3S$ and/or CT mineralogical phases.

According to another variant of the invention, the clinker with a high content of belite may comprise from 0.1 to 1% by mass of $C_2AS$ and/or $C_{12}A_7$ and/or $C_3S$ and/or CT mineralogical phases. According to a variant of the invention, the clinker with a high content of belite may comprise less than 0.5% of $C_3S$ mineralogical phases, in particular it may comprise from 0.01 to 0.5% of $C_3S$ mineralogical phases, in % expressed by mass relative to the total mass of clinker.

The $C_2AS$ mineralogical phase is understood to be gehlenite.

The $C_{12}A_7$ mineralogical phase is understood to be mayenite.

The $C_3S$ mineralogical phase is understood to be alite.

The CT mineralogical phase is understood to be perovskite.

The clinker obtainable by the process according to the invention is a clinker with a high content of belite, preferably comprising 40 to 75% of belite, preferably from 45 to 70% of belite, more preferably from 45 to 65% of belite, most preferably from 50 to 60% of belite, % expressed by mass relative to the total mass of clinker. Advantageously it is a Belite-Calcium-Sulphoaluminate-Ferrite clinker (BCSAF) comprising at least in % expressed by mass relative to the total mass of BCSAF clinker

- from 5 to 30%, of a calcium aluminoferrite phase of a composition corresponding to the general formula $C_2A_XF_{(1-X)}$, wherein X is from 0.2 to 0.8;
- from 10 to 35%, of a calcium sulfoaluminate phase <<ye'elimite>> ($C_4A_3\$$),
- from 40 to 75% of belite ($C_2S$),
- from 0.01 to 10% of one or more minor phases selected from calcium sulphates, alkali sulphates, perovskite, gehlenite, free lime and periclase, and/or a vitreous phase,
- and for which the total of the percentages of these phases is greater than or equal to 97%.

Belite is a well known mineralogical phase for the person skilled in the art which, in the pure state, has the composition $Ca_2SiO_4$ but which may also contain impurities.

The <<ye'elimite>> phase is a mineralogical phase which, in the pure state, has the composition $Ca_4Al_6SO_{16}$ but which may also contain impurities.

The aluminoferrite phase is a mineralogical phase which, in the pure state, has the formula $C_2A_XF_{(1-X)}$, wherein X is from 0.2 to 0.8 but which may also contain impurities.

Impurities are to be understood as any element of the Periodic Table of Elements.

Advantageously, the total of the percentages of the said phases of the BCSAF clinker is greater than or equal to 97%, preferably greater than or equal to 98%, more preferably greater than or equal to 99%, most preferably greater than or equal to 100%.

Preferably the mineralogical phases of the BCSAF clinker further comprise one or more secondary elements selected from magnesium, sodium, potassium, boron, phosphorus, zinc, manganese, titanium, fluorine, chlorine.

The mineralogical phases of the BCSAF clinker may comprise as major elements: calcium, aluminium, silica, iron, oxygen and sulphur.

The BCSAF clinker may comprise at least the following main oxides present in relative proportions, % expressed by mass relative to the total mass of BCSAF clinker:

CaO: 45 to 61%
Al2O3: 8 to 22%
SiO2: 15 to 25%
Fe2O3: 3 to 15%
$SO_3$: 2 to 10%.

The mineralogical phases of the BCSAF clinker may comprise one or more secondary elements, in % expressed by mass relative to the total mass of BCSAF clinker, selected from magnesium, sodium, potassium, boron, phosphorus, zinc, manganese, titanium, fluorine, chlorine, preferably present in the following quantities:

from 0 to 5% of magnesium expressed as magnesium oxide,
from 0 to 5% of sodium expressed as sodium oxide,
from 0 to 5% of potassium expressed as potassium oxide,
from 0 to 3% of boron expressed as boron oxide,
from 0 to 7% of phosphorus expressed as phosphoric anhydride,
from 0 to 5% of zinc, manganese, titanium or mixture thereof, expressed as oxides of these elements,
from 0 to 3% of fluoride, chloride, or mixture thereof, expressed as calcium fluoride and calcium chloride,
the total content of the said secondary elements being less than or equal to 15%.

The mineralogical phases of the BCSAF clinker may preferably comprise, in % expressed by mass relative to the total mass of BCSAF clinker, the following secondary elements:
from 1 to 4% of magnesium expressed as magnesium oxide,
from 0.1 to 2% of sodium expressed as sodium oxide,
from 0.1 to 2% of potassium expressed as potassium oxide,
from 0 to 2% of boron expressed as boron oxide,
from 0 to 4% of phosphorus expressed as phosphoric anhydride,
from 0 to 3% of zinc, manganese, titanium or mixture thereof, expressed as oxides of these elements,
from 0 to 1% of fluoride, chloride, or mixture thereof, expressed as calcium fluoride and calcium chloride.

The mineralogical phases of the BCSAF clinker may preferably comprise, in % expressed by mass relative to the total mass of BCSAF clinker, the following secondary elements:
from 0.2 to 1.5% of sodium expressed as sodium oxide,
from 0.2 to 1.5% of potassium expressed as potassium oxide,
from 0.2 to 2% of boron expressed as boron oxide,
from 0 to 1% of fluoride plus chloride, or mixture thereof, expressed as calcium fluoride and calcium chloride.

Preferably, the mineralogical phases of the BCSAF clinker may comprise, in % expressed by mass relative to the total mass of BCSAF clinker, the following secondary elements:
from 0.2 to 2% of boron expressed as boron oxide;
from 0.1 to 2% of potassium expressed as potassium oxide.

According to another preferred embodiment, the mineralogical phases of the BCSAF clinker may comprise, in % expressed by mass relative to the total mass of BCSAF clinker, the following secondary elements:
from 0.2 to 2% of boron expressed as boron oxide;
from 0.1 to 2% of sodium expressed as sodium oxide.

According to another preferred embodiment, the mineralogical phases of the BCSAF clinker may comprise, in % expressed by mass relative to the total mass of BCSAF clinker, the following secondary element:
from 0.2 to 2% of boron expressed as boron oxide.

According to another preferred embodiment, the mineralogical phases of the BCSAF clinker may comprise, in % expressed by mass relative to the total mass of BCSAF clinker, the following secondary elements:
from 0.2 to 2% of potassium expressed as potassium oxide;
from 0.5 to 4% of phosphorus expressed as phosphorus oxide ($P_2O_5$).

According to another preferred embodiment, the mineralogical phases of the BCSAF clinker may comprise, in % expressed by mass relative to the total mass of BCSAF clinker, the following secondary elements:
from 0.2 to 2% of potassium expressed as potassium oxide;
from 0.5 to 4% of phosphorus expressed as phosphorus oxide ($P_2O_5$);
less than 0.1% of boron expressed as boron oxide.

According to a variant of the invention, the BCSAF clinker according to the invention does not comprise borax or boron or compounds comprising boron.

The following examples illustrate the invention without restricting its scope.

EXAMPLES

Preparation of a Belitic Cement According to the Invention Produced in a Rotary Type of Cement Plant Kiln The preparation described herein after comprises the steps of:
- preparing the raw materials: grinding
- preparing the raw meal: mixing of the raw materials and granulation
- preparing the clinker: calcination of the raw meal in a rotary type of cement plant kiln
- preparing the cement: grinding and adding sulphate
- determining the mechanical performances on mortars according to the EN 196-1 Standard 1) Preparation of the Raw Materials The target chemical composition of our raw meal was obtained by mixing six raw materials, the chemical compositions of which are specified in the following table:

| % | CaO | Al2O3 | SiO2 | Fe2O3 | SO3 | MgO | TiO2 | K2O | Na2O | B2O3 | others |
|---|---|---|---|---|---|---|---|---|---|---|---|
| Limestone | 54.64 | 0.32 | 0.44 | 0.06 | 0.00 | 0.71 | 0.00 | 0.04 | 0.08 | 0.00 | 0.00 |
| Clay | 1.32 | 35.71 | 46.11 | 1.07 | 0.00 | 0.48 | 0.10 | 2.20 | 0.49 | 0.00 | 0.00 |
| Anhydrous calcium sulphate | 40.80 | 0.18 | 0.36 | 0.12 | 56.84 | 0.00 | 0.00 | 0.00 | 0.00 | 0.00 | 0.00 |
| Iron oxide | 0.00 | 0.00 | 1.89 | 95.30 | 0.00 | 0.03 | 0.05 | 0.00 | 0.00 | 0.00 | 0.67 |
| Bauxite | 1.04 | 82.65 | 7.58 | 2.12 | 0.00 | 0.36 | 3.93 | 0.89 | 0.18 | 0.00 | 0.00 |
| Boric acid ($H_3BO_3$) | 0.00 | 0.00 | 0.00 | 0.00 | 0.00 | 0.00 | 0.00 | 0.00 | 0.00 | 56.3 | 0.00 |

The preparation of these raw materials (except the boric acid already in a powder form) consisted in a separate grinding step, using a conventional ball-mill grinder in order to have 5% oversize maximum at 100 μm except for the limestone for which 7.6% oversize at 100 μm was obtained due to the caulking aspect of this product (percentage by mass).

| Raw Materials | Oversize at 100 μm (% by mass) |
|---|---|
| Clay | 3.1% |
| Anhydrite | 0.5% |
| Limestone | 7.6% |
| Bauxite | 2.4% |
| Iron oxide | 0.1% |

2) Mixing the Raw Materials and Granulation of the Raw Meal

The raw materials prepared in step 1) to which the boric acid was added were mixed and homogenised using a cyclone type of installation equipped with a blade which provokes stirring of the air and the solid particles in the tank. The stirring time was set at 1 hour 30 minutes in order to ensure perfect homogenisation of the mix.

| | Limestone | Clay | Anhydrous calcium Sulphate | Iron oxide | Bauxite | H3BO3 |
|---|---|---|---|---|---|---|
| % in the mix | 60.12% | 22.87% | 6.1% | 4.67% | 4.50% | 1.74% |

The mix thus obtained, referred to as the raw meal, was then granulated using a standard granulation plate.

The granulated raw meal was dried in a drying oven at 105° C. in order to obtain perfectly dry granules at the time of their introduction in the kiln.

3) Calcination of the Granulated Raw Meal and Obtaining a Belitic Clinker

The calcining step of the raw meal (step (ii) according to the invention) was carried out in a rotary kiln, 16 meters in length for 1 meter inside diameter, heated by an air-fuel main burner. The speed of the kiln was set at 1.2 rpm and the feed flow rate of raw meal was set at 350 kg/h. A laser pyrometer was installed in order to measure the temperature of the clinker at approximately ⅔ of the length of the flame, which is to say in the clinkerisation zone.

The following procedure was followed for this calcination:

Progressive heating of the kiln and according to the same procedure as for a Portland cement up to 1100° C. (measured using the pyrometer);

Beginning of the introduction of the granulated raw meal and increase of the temperature of the kiln up to 1200-1225° C.;

Waiting for thermal stabilisation for 1 hour;

Progressive increasing of the temperature of the kiln for approximately 45 minutes up to 1300-1325° C.;

stabilisation of the temperature of the kiln between 1300 and 1325° C.

After leaving the kiln, the clinker was submitted to cooling in ambient air in a rotary tube equipped with lifts which make it possible to ensure good contact and good clinker-air exchanges.

Samples of 6 to 8 kg of clinkers were taken at regular intervals of approximately 30 minutes for later physical-chemical characterisation tests which consisted in:

measuring the weight per liter of the clinker granules (step (iii) according to the invention) according to the method previously described in the description;

determining the content of $SO_3$ in the clinker ($SO_3$ Ck) by an elementary infrared analyser (step (iv) according to the invention);

determining the content of free CaO (step (v) according to the invention) by X-ray diffraction (DRX) combined with a Rietveld analysis.

4) Preparation of the Cement

The preparation phase of the cement using the clinker sampled in the previous step was carried out using a conventional ball-mill grinder in the presence of 10% by mass of anhydrite (identical to the one having served to prepare the raw meal).

Compressive mechanical strength tests (CS) on mortars were carried out according to the specifications of the EN 196-1 Standard.

The table below illustrates the obtained results

| Weight per litre (g/L) | CS at 28 days (Mpa) | % $SO_3$ Ck | % $SO_3$ raw meal | % $SO_3$ raw meal/ % $SO_3$ckr | Free CaO (%) |
|---|---|---|---|---|---|
| 610 | * | 4.83 | 5.00 | 1.04 | 1.25 |
| 810 | 55.64 | 4.85 | 5.00 | 1.03 | 0.22 |
| 1030 | 51.14 | 4.80 | 5.00 | 1.04 | 0.29 |
| 1450 | 45.26 | 4.80 | 5.00 | 1.04 | 0.25 |
| 1292 | 40.07 | 4.81 | 5.00 | 1.04 | 0.27 |
| 1329 | 44.86 | 4.61 | 5.00 | 1.08 | 0.25 |
| 1460 | 48.34 | 4.68 | 5.00 | 1.07 | 0.28 |
| 1495 | 38.52 | 4.77 | 5.00 | 1.05 | 0.31 |
| 1418 | 48.34 | 4.47 | 5.00 | 1.12 | 0.47 |
| 1331 | 39.09 | 4.64 | 5.00 | 1.08 | 0.41 |
| 1103 | 41.79 | 4.54 | 5.00 | 1.10 | 0.15 |
| 1070 | 42.69 | 4.40 | 5.00 | 1.14 | 0.18 |
| 1046 | 40.05 | 4.32 | 5.00 | 1.16 | 0.23 |
| 915 | 54.22 | 4.52 | 5.00 | 1.11 | 0.18 |
| 643 | * | 4.82 | 5.00 | 1.04 | 1.2 |

* these cements do not provide correct placing in the steel moulds used to produce the mortar specimens.

The invention claimed is:

1. A process for producing a clinker comprising 40 to 75% of belite, % by mass relative to the total mass of clinker, said process comprising:

(i) introducing a raw meal into a calcination chamber of a cement plant kiln;

(ii) calcining the raw meal at a temperature of from 1150° C. to 1375° C.;

(iii) measuring a weight per liter of the product of step (ii) and eliminating the product having a weight per liter strictly less than 650 g/liter;

(iv) measuring a quantity of $SO_3$ in the product of step (ii) and eliminating the product having a ratio of quantity of $SO_3$ of the decarbonated raw meal/quantity of $SO_3$ in the product of step (ii) less than or equal to 0.75 and greater than or equal to 1.2;

(v) measuring a quantity of free lime (CaOl) in the product of step (ii) and eliminating the product having a quantity of free lime strictly greater than 1.5%, percentage by mass of free lime in the product of step (ii).

2. The process according to claim 1, wherein the raw meal introduced in step (i) comprises at least a source of calcium, a source of silica, a source of alumina, a source of iron, a source of sulphur, a source of boron.

3. The process according to claim 1, comprising pre-calcinating the raw meal.

4. The process according to claim 1, wherein step (i) is carried out in a rotary kiln or an electric kiln or a continuous kiln or any other type of cement plant kiln.

5. The process according to claim 1, wherein in step (iv), the product of step (ii) having a ratio of quantity of $SO_3$ of the decarbonated raw meal/quantity of $SO_3$ in the product of step (ii) equal to 1 is not eliminated.

6. The process according to claim 1, wherein in step (v), the product of step (ii) having a quantity of free lime strictly greater than 1% is eliminated, percentage by mass of free lime in the product of step (ii).

* * * * *